United States Patent

[11] 3,598,147

| [72] | Inventor | Tadao Kosaka<br>Ichikawa, Japan |
|---|---|---|
| [21] | Appl. No. | 13,304 |
| [22] | Filed | Feb. 24, 1970 |
| [45] | Patented | Aug. 10, 1971 |
| [73] | Assignee | Nippon Piston Ring Kabushiki Kaisha |

[54] MECHANISMS FOR FEEDING AIR INTO A ROTARY MEMBER
4 Claims, 4 Drawing Figs.

| [52] | U.S. Cl. | 137/580 |
|---|---|---|
| [51] | Int. Cl. | F16L 39/04 |
| [50] | Field of Search | 137/580 |

[56] References Cited
UNITED STATES PATENTS

| 2,242,184 | 5/1941 | Reuter | 137/580 |
| 2,401,061 | 5/1946 | Fawick | 137/580 |
| 2,485,692 | 10/1949 | Brill | 137/580 |
| 2,600,102 | 6/1952 | Fawick | 137/580 |

*Primary Examiner*—William R. Cline
*Attorney*—Kelman and Berman

ABSTRACT: A mechanism for feeding compressed air from a stationary air line to a rotating, air-operated clutch has a disc mounted on the rotating clutch body and partly enclosed in an annular chamber in a casing open toward the axis of rotation. The casing is freely rotatably mounted on the rotating member and stationary. Annular, circular grooves in axially opposite walls of the chamber receive sealing rings which may be forced outward of the grooves into engagement with the disc by compressed air fed to the grooves. A duct in the disc connects the chamber with the hollow interior of the clutch body and is controlled by a valve which is opened when one of the sealing rings is forced out of the associated groove.

MECHANISMS FOR FEEDING AIR INTO A ROTARY MEMBER

This invention relates to fluid-operated apparatus and particularly to a mechanism for feeding air or other fluid to a rotating member.

In its more specific aspects, the invention will be described with reference to a clutch arranged between a marine engine and the screw propeller of a ship. An air-operated clutch was not practical in such an application heretofore because it required a long air passage in the shaft for connecting the expansion chamber of the clutch with an airhose arranged at an accessible end face of the shaft by means of a rotary seal.

The principal object of this invention is the provision of an improved mechanism for feeding air to a rotary member operated by compressed air while rotating, such as an air-operated clutch, and more particularly the provision of an air-feeding mechanism which may be attached directly to the expansion chamber of the clutch.

With these objects and others in view, the invention provides apparatus of the type described with a hollow member, such as a clutch body, mounted for rotation about an axis and with a casing which defines an annular chamber about the axis, and has two axially spaced walls in the chamber which is open toward the axis. The casing is mounted on the member for rotation relative to the same, whereby it may be stationary during rotation of the hollow member.

A disc member is mounted on the hollow member for rotation about the common axis and is partly received in the chamber between the aforementioned walls. The disc member is formed with a duct sealed from the ambient atmosphere which connects the interior of the hollow member to the chamber in the casing and may be opened and closed by a valve. Two sealing members which are annular about the axis are received in respective grooves of the two chamber walls for axial movement toward and away from the disc member in sealing engagement with the casing.

Three conduits communicate with the chamber and the two grooves respectively and are adapted to supply fluid under pressure in such a manner so as to axially move the sealing members outward of the associated grooves toward the disc member. A motion-transmitting train is interposed between one of the sealing members and the valve in the disc member for moving the valve between its duct-opening and duct-closing positions in response to axial movement of the sealing member.

Other features and many of the attendant advantages of this invention will readily be appreciated when the same is better understood by reference to the following detailed description of a preferred embodiment when considered in connection with the appended drawing in which.

Figure 1:
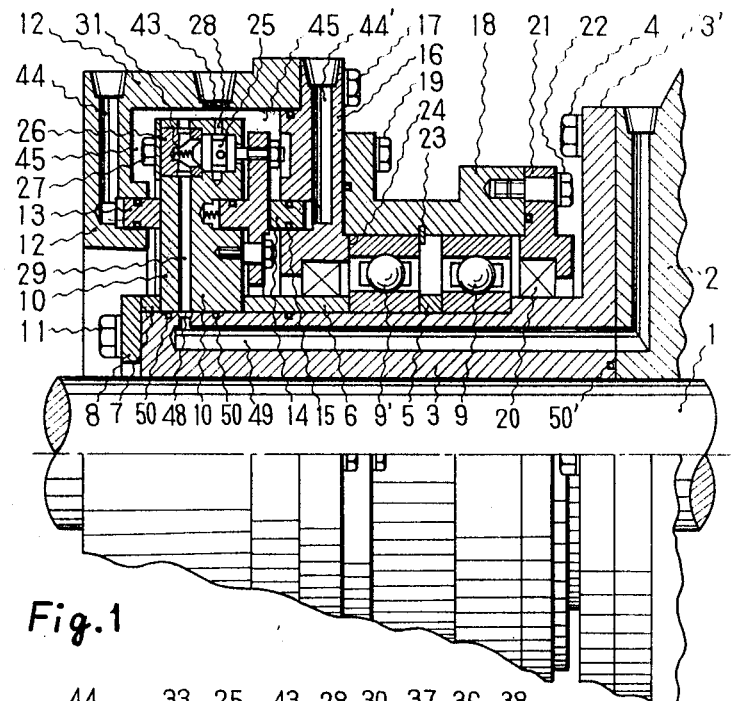
FIG. 1 shows an air-feeding mechanism of the invention and associated elements in side elevation and partly in elevational section.

The drawing shows as much of a drive arrangement of the type described above as is necessary for an understanding of the invention. The drive shaft 1 supports the casing 2 of a clutch, not otherwise shown. A hollow shaft 3 coaxial with the drive shaft 1 is attached to the casing 2 by a flange 3' on the hollow shaft 3 and bolts 4. Collars 5,6,7 axially spaced on the hollow shaft 3 and a ring plate 8 fastened to the front face of the shaft 3 by bolts 11 axially secure two ball bearings 9,9' and a disc 10 on the shaft 3.

The peripheral portion of the disc 10 is enveloped by an annular casing 12, and the disc 10 and casing 12 jointly define a chamber 45 therebetween. In the illustrated condition of the apparatus, the chamber 45 is sealed from the ambient air by an annular piston 13 movable in a circular groove 46 of the casing 12, sealed to the casing 12 by O-rings 47, and abuttingly engaged by the radial front face of the disc 10. The rear wall 16 of the casing is assembled with the remainder of the casing by bolts 17 and has a circular groove 46' opposite the groove 46. An annular piston 14 is movable received in the groove 46'.

The casing wall 16 is fixedly fastened to a bearing box 18 by bolts 19. The box carries the outer races of the ball bearings 9,9', and the bearings are protected against oil loss by an oil seal 15 between the casing wall 16 and the hollow shaft 3 and by another oil seal 20 between the hollow shaft 3 and a retaining ring 21 attached to the bearing box 18 by bolts 22.

The outer race of the ball bearing 9' is received between a stop ring 23 on the inner wall of the bearing box 18 and a radial face 24 of the casing wall 16, whereby the casing 12 and associated elements are axially fixed on the hollow shaft 3 while being freely rotatable thereon.

The aforementioned disc 10 which is capable or rotating freely relative to the casing 12 has eight circumferentially distributed axial bores 34 of stepped cylindrical configuration. A check valve 25 is retained in each bore by a cover 26 held in position by a bolt 27 and controls the passage of fluid between a radial, outwardly open portion 28 of a duct in the disc 10 and another duct portion 29 which leads radially inward from the bore 34 toward the hollow shaft 3. The spindle 30 of the valve 25 is biased away from the cover 26 by a spring 31 to engage the valve 25 with a valve seat 32.

Figure 4:
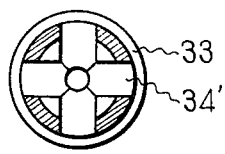
FIG. 4 shows an element of the apparatus of FIG. 2 in front elevational section.

The valve bore 34 communicates with the duct portion 29 through radial passages 34' in the cover 26, best seen in FIG. 4, and an outer annular groove 33 in the cover which connects the passages 34' with each other and with the duct portion 29.

The valves 25 are normally held closed by the springs 31 and fluid pressure in the duct 29 and may be opened by pins 37 threadedly mounted on an annular disc 36 in an adjustable axial position fixed by a lock nut 38. The disc 36 is mounted on the disc 10 by means of an annular axial flange 35 slidably sealed in a corresponding groove 39 of the disc 10 by O-rings 47. The flange 35 is biased axially outward of the groove 39 by helical compressions springs 40 circumferentially distributed in the groove 39 and set in spring seats 39' in the bottom of the groove 39.

Axial movement of the disc 36 by the springs 40 is limited to the illustrated position by shoulder bolts 42 on the disc 10 which freely pass through axial bores in the radially innermost portion 41 of the disc 36 and keep the pins 37 aligned with the valve stems 30.

In the installed condition of the apparatus, an air tank and a control valve, not shown, are connected with inlets 43,44,44' on the stationary casing 12 which respectively communicate with the chamber 45 and the grooves 46,46'. The several ducts 29 communicate with an annular groove 48 in the outer face of the hollow shaft 3. An axial bore 49 in the shaft is connected with the air inlet of the clutch casing 2. Sealing rings 50,50' are provided as needed to prevent escape of air from the groove 48 and from the interface of the flange 3' and clutch casing 2 to the atmosphere.

Figure 2:
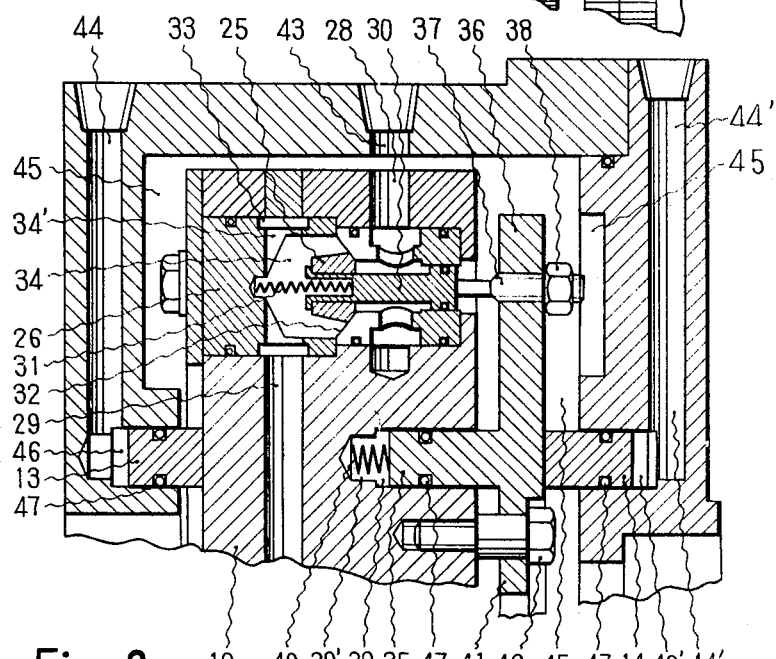
FIG. 2 shows a portion of the apparatus of FIG. 1 on a larger scale.
Figure 3:
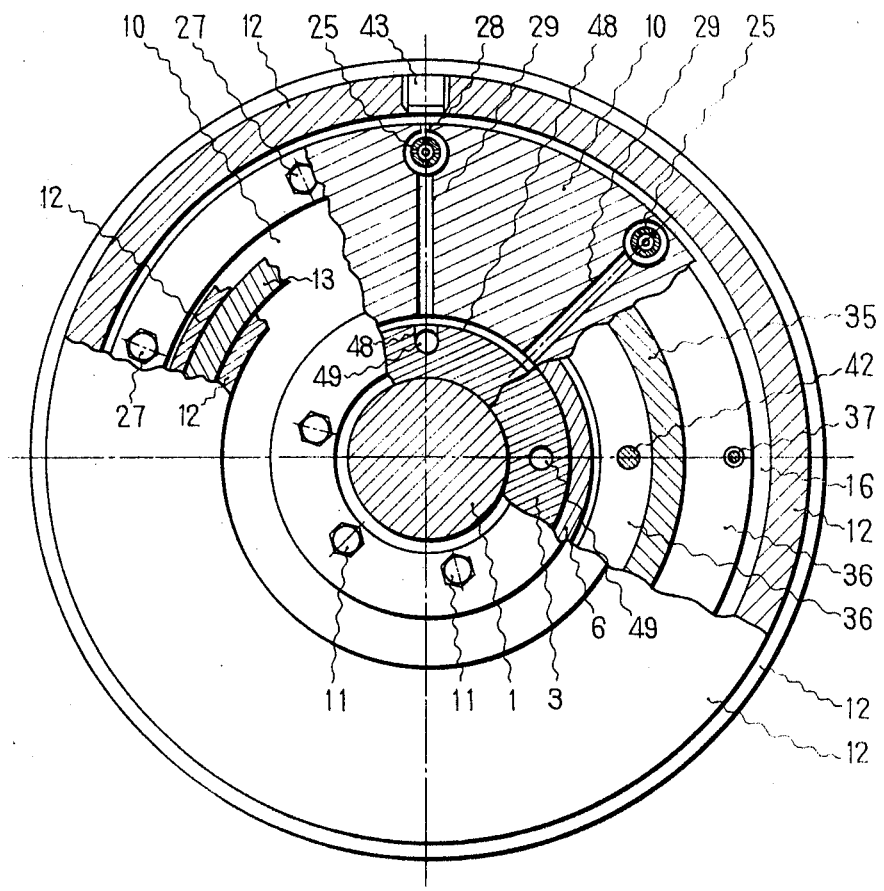
FIG. 3 is a front elevation of the apparatus of FIG. 1, partly broken away to reveal internal structure.

The aforedescribed apparatus operates as follows:

When the nonillustrated valve is opened, compressed air is admitted to the chamber 45 and the grooves 46,46'. The piston 13 engages the axially fixed front face of the disc 10 under the air pressure in the groove 46 and prevents the escape of air from the chamber 45 to the atmosphere through the central opening in the casing 12. The piston 14 is pressed against the radial rear face of the disc 36 by air pressure in the groove 46' further to seal the chamber 45, and to shift the disc 36 with its pins 37 to the left, as viewed in FIG. 2 against the restraint of the springs 31,40, whereby the valves 25 are opened, and air under pressure can flow from the inlet 43 into the clutch casing 2 to operate the clutch in a manner known in itself.

Because of the airflow from the chamber 45 to the clutch casing 2, the air pressure in the chamber 45 is lower than in the grooves 46,46', and a firm seal is therefore provided between the pistons 13,14 and the discs 10,36.

Operating air is thus supplied to the air expansion chamber 5 in the clutch casing 2 without pressure loss.

When all the necessary air has been supplied to the clutch, the inlets 43,44,44' are simultaneously vented by the nonillustrated control valve. Because of the release of pressure on the piston 14, the disc 36 is returned by the springs 31,40 to the illustrated position, and the valves 25 are closed to retain the compressed air in the expansion chamber of the clutch. When it is desired to release the air from the clutch, compressed air is supplied only to the groove 46', whereby the piston 14 displaces the disc 36 to open the valves 25. Air may escape from the chamber 45 through the vented inlet 43.

The apparatus of the invention thus provides air under pressure to a rotating element without requiring air to be supplied to an end face of a supporting shaft. The annular pistons 13,14 and discs 10,36 rotate relative to each other only for short periods and are thus not subjected to constant friction and overheating. Because the piston 14 operates both as an air seal and a valve-operating member, the apparatus is compact. All valves 25 are opened by applied force when air is to be fed to or discharged from the clutch, whereby reliable operation and minimal pressure loss is achieved. The clutch together with its air supply mechanism may be installed anywhere on the drive shaft. These advantages are not available in conventional airfeeding mechanism for clutches of the type described.

While the invention has been described with particular reference to its application for providing compressed air to an air clutch, it will be understood to be applicable to all other rotary machines requiring a controlled supply of a fluid.

What I claim is:

1. A fluid operated apparatus comprising, in combination:
 a. a hollow member mounted for rotation about an axis;
 b. a casing defining an annular chamber about said axis,
   1. said casing having two axially spaced walls in said chamber,
   2. said chamber being open toward said axis, and
   3. said casing being mounted on said member for rotation relative to the same, whereby said casing may be stationary during said rotation of said hollow member;
 c. a disc member mounted on said hollow member for rotation about said axis and partly received in said chamber between said walls,
   1. said disc member being formed with a duct sealed from the ambient atmosphere and connecting the interior of said hollow member to said chamber;
 d. a valve movable in said duct between a duct-opening and a duct-closing position;
 e. two sealing members annular about said axis and received in respective grooves of said walls for axial movement toward and away from said disc member in sealing engagement with said casing;
 f. three conduits respectively communicating with said chamber and with said grooves and adapted to supply fluid under pressure so as to axially move said sealing members outward of the associated grooves toward said disc member; and
 g. motion transmitting means interposed between one of said sealing members and said valve for moving the valve between said positions thereof in response to said axial movement of said one sealing member.

2. An apparatus as set forth in claim 1, wherein said motion transmitting means are effective for moving said valve member from said duct closing toward said duct-opening position in response to movement of said one sealing member outward of the associated groove under the pressure of the supplied fluid.

3. An apparatus as set forth in claim 1, wherein said valve moves axially between said positions thereof, and said motion-transmitting means include a motion-transmitting member axially movable on said disc member, yieldably resilient means biasing said motion-transmitting member axially toward said one sealing member, and a pin member axially projecting from said motion-transmitting member for abutting engagement with said valve.

4. An apparatus as set forth in claim 1, wherein said grooves are circular and conformingly engaged by said sealing members respectively.